United States Patent
Kral

(10) Patent No.: US 6,423,791 B1
(45) Date of Patent: Jul. 23, 2002

(54) PROCESS FOR THE PRODUCTION OF LINEAR LOW DENSITY ETHYLENE COPOLYMERS

(75) Inventor: Bohumil V. Kral, Victoria (AU)

(73) Assignee: ExxonMobil Oil Corporation, Fairfax, VA (US)

( * ) Notice: Subject to any disclaimer, the term of this patent is extended or adjusted under 35 U.S.C. 154(b) by 1534 days.

(21) Appl. No.: 08/738,920

(22) Filed: Oct. 28, 1996

Related U.S. Application Data

(63) Continuation of application No. 07/785,172, filed on Oct. 28, 1991, now abandoned, which is a continuation of application No. 07/494,335, filed on Mar. 16, 1990, now abandoned.

(51) Int. Cl.$^7$ .................................................. C08F 2/00
(52) U.S. Cl. ............................. 526/68; 526/68; 526/71; 528/483
(58) Field of Search ............................. 526/68, 88, 71; 528/483

(56) References Cited

U.S. PATENT DOCUMENTS

| | | | |
|---|---|---|---|
| 3,509,115 A | | 4/1970 | French |
| 4,215,207 A | * | 7/1980 | Durand et al. ............... 526/64 |
| 4,319,021 A | * | 3/1982 | Irani et al. .................... 528/498 |
| 4,342,853 A | * | 8/1982 | Durand et al. ............... 526/68 |
| 4,405,774 A | | 9/1983 | Miwa et al. ............. 526/348.2 |
| 4,530,983 A | | 7/1985 | Matsuura et al. ........... 526/125 |
| 4,558,105 A | | 12/1985 | Carrick et al. ............... 526/68 |
| 4,719,270 A | * | 1/1988 | Miwa et al. .................... 526/68 |
| 4,725,667 A | * | 2/1988 | Kleintjens .................... 528/483 |
| 5,071,950 A | * | 12/1991 | Borho et al. .................... 526/68 |

FOREIGN PATENT DOCUMENTS

| | | |
|---|---|---|
| GB | 1338280 | 11/1973 |
| JP | 86-276804 | 12/1986 |

* cited by examiner

*Primary Examiner*—David W. Wu
*Assistant Examiner*—Ling-Siu Choi
(74) *Attorney, Agent, or Firm*—Stephen D. Prodnuk

(57) ABSTRACT

A process is provided for producing an essentially linear copolymer of ethylene and a minor amount of a 1-olefin containing more than 2 carbon atoms comprising contacting said ethylene and 1-olefin with a Ziegler catalyst in a polymerization reaction zone at elevated temperature and pressure, contacting the polymerization reaction mixture containing polymer and unreacted monomers with a fresh supply of ethylene in a high pressure separation zone (HPS) operating at a lower pressure than the reaction zone such that the contents of the separation zone separates into a dense phase containing a major proportion of polymer, and a light phase containing a major proportion of unreacted monomers, and separately withdrawing the two phases from the separation zone. The polymer containing dense phase is then subsequently treated to obtain a purified polymer product, and at least a portion of the unreacted monomers in the light phase is generally re-used in the reaction, with or without some intermediate treatment or purification.

6 Claims, 1 Drawing Sheet

PROCESS FOR THE PRODUCTION OF LINEAR LOW DENSITY ETHYLENE COPOLYMERS

This is a continuation of application Ser. No. 07/785,172, filed on Oct. 28, 1991, now abandoned which is a continuation of 07/494,355, filed on Mar. 16, 1990 now abandoned.

BACKGROUND OF THE INVENTION

1. Field of the Invention

This invention relates to an improved process for the production of linear low density copolymers of ethylene and a minor amount of an olefin containing at least 4 carbon atoms (LLDPE).

2. Description of Related Art

The following information is disclosed in accordance with the terms of 37 CFR 1.56, 1.97 and 1.98.

U.S. Pat. No. 4,405,774 issued Sep. 20, 1983 to Miwa et al., discloses LLDPE having improved transparency prepared by copolymerizing ethylene with an α-olefin containing 4 to 10 carbon atoms utilizing a catalyst comprising an organometallic compound such as a trialkylaluminum and a contact product of a magnesium compound and a titanium compound. The copolymerization may be carried out in at least one continuous stirred reactor or at least one continuous tubular reactor.

U.S. Pat. No. 4,530,983 issued Jul. 23, 1985 to Matsuura et al., discloses the preparation of LLDPE by the copolymerization of ethylene and an α-olefin having 3 to 14 carbon atoms in the presence of a catalyst comprising A) a solid composition prepared by mixing and pulverizing a magnesium halide, titanium trichloride, and an electron donor; and B) an organoaluminum compound containing a halogen.

U.S. Pat. No. 3,509,115 issued Apr. 26, 1970 to French, describes the production of ethylene-vinyl acetate copolymers at elevated temperatures and pressures wherein the product is subjected to a high pressure recovery step to remove unreacted ethylene, and the temperature is reduced during the recovery step by adding ethylene to the product stream prior to the recovery step to reduce acetic acid odor in the copolymer.

U.S. Pat. No. 4,215,207 issued Jul. 29, 1980 to Durand et al., describes a high pressure process for the polymerization or copolymerization of ethylene utilizing a separator operating at a substantially lower pressure than the reactor wherein the temperature of the separator is reduced by the injection of monomer into the reactor effluent at a pressure below that of the separator prior to its entry into the separator.

U.S. Pat. No. 4,558,105 issued Dec. 10, 1985 to Carrick et al., discloses the copolymerization of ethylene with a higher 1-olefin in the presence of an inert gaseous ratio modifier such as ethane for the purpose of avoiding liquid condensation and controlling polymer density.

Japanese published patent application (Kokai) JP SHO 61-276,804 [86-276,804] published Dec. 6, 1986 [abstracted in C.A. 106:157041u (1987)], discloses the production of LLDPE by copolymerizing ethylene and an α-olefin in the presence of a catalyst prepared by prepolymerizing the α-olefin with a solid component containing trivalent Ti, Mg and Cl, an organoaluminum compound, and an electron donor having C—O or C—N bonds.

Other Background Information

Linear low density polyethylenes (LLDPE), which are generally linear copolymers of ethylene and a minor amount of an 1-olefin, i.e., a 1-alkene, containing at least 4 carbon atoms, may be prepared by contacting the comonomers with a Ziegler catalyst at a relatively high pressure e.g., 500 to 3000 bars, in a tubular or continuous stirred reactor. The effluent from the reactor is then passed to a "high pressure separator" (HPS) in which the polymer present in a dense phase is separated from the unreacted monomers present in a light phase. The separation is carried out at a pressure which is still high although somewhat lower than the reactor pressure.

Because the ethylene tends to polymerize much more readily than the 1-olefin comonomer, the concentration of unpolymerized 1-olefin in the HPS is normally significantly higher than that in the polymer (in polymerized form) or in the reactor feed mixture. Moreover, such concentration increases as the percent conversion of monomers is raised. An undesirable effect of this is that the polymer tends to become more soluble in the light phase containing the unreacted monomers as the percentage of 1-olefin in this phase increases with the percent conversion. Thus, in any particular system of LLDPE production as described, there is a practical maximum of percent conversion of monomers above which the percentage of unreacted 1-olefin in the light phase normally becomes high enough to cause sufficient polymer to dissolve in the light phase so as to give rise to plugging of the equipment downstream of the separator. Furthermore, the increased content of dissolved polymer in the light phase cannot be easily recovered and thus may significantly reduce the yield of polymer from the process.

SUMMARY OF THE INVENTION

In accordance with this invention, LLDPE is produced by contacting ethylene and a minor amount of a 1-olefin containing more than 2 carbon atoms with a Ziegler catalyst in a polymerization reaction zone at elevated temperature and pressure, contacting the polymerization reaction mixture containing polymer and unreacted monomers with a fresh supply of ethylene in a high pressure separation zone (HPS) operating at a lower pressure than the reaction zone such that the contents of the separation zone separates into a dense phase containing a major proportion of polymer, and a light phase containing a major proportion of unreacted monomers, and separately withdrawing the two phases from the separation zone. The polymer-containing dense phase is then subsequently treated to obtain a purified polymer product, and at least a portion of the unreacted monomers in the light phase is generally re-used in the reaction with or without some intermediate treatment or purification.

An intended result of the injection of a fresh supply of ethylene into the reaction mixture for separation in the HPS is that it reduces the concentration of 1-olefin in the light phase present in the HPS, because of the dilution effect of the added ethylene. This in turn reduces the solubility of polymer in the light phase thus increasing the yield and minimizing the tendency of dissolved polymer to plug the equipment intended to handle such light phase downstream of the HPS. Such reduced plugging tendency allows for the possibility of running the reaction at a higher monomer conversion rate before the concentration of polymer the light phase becomes high enough to cause disruptive plugging.

BRIEF DESCRIPTION OF THE DRAWING

The drawing is a schematic diagram of a process illustrating the inventive process.

DESCRIPTION OF PREFERRED EMBODIMENTS

Figure 1:
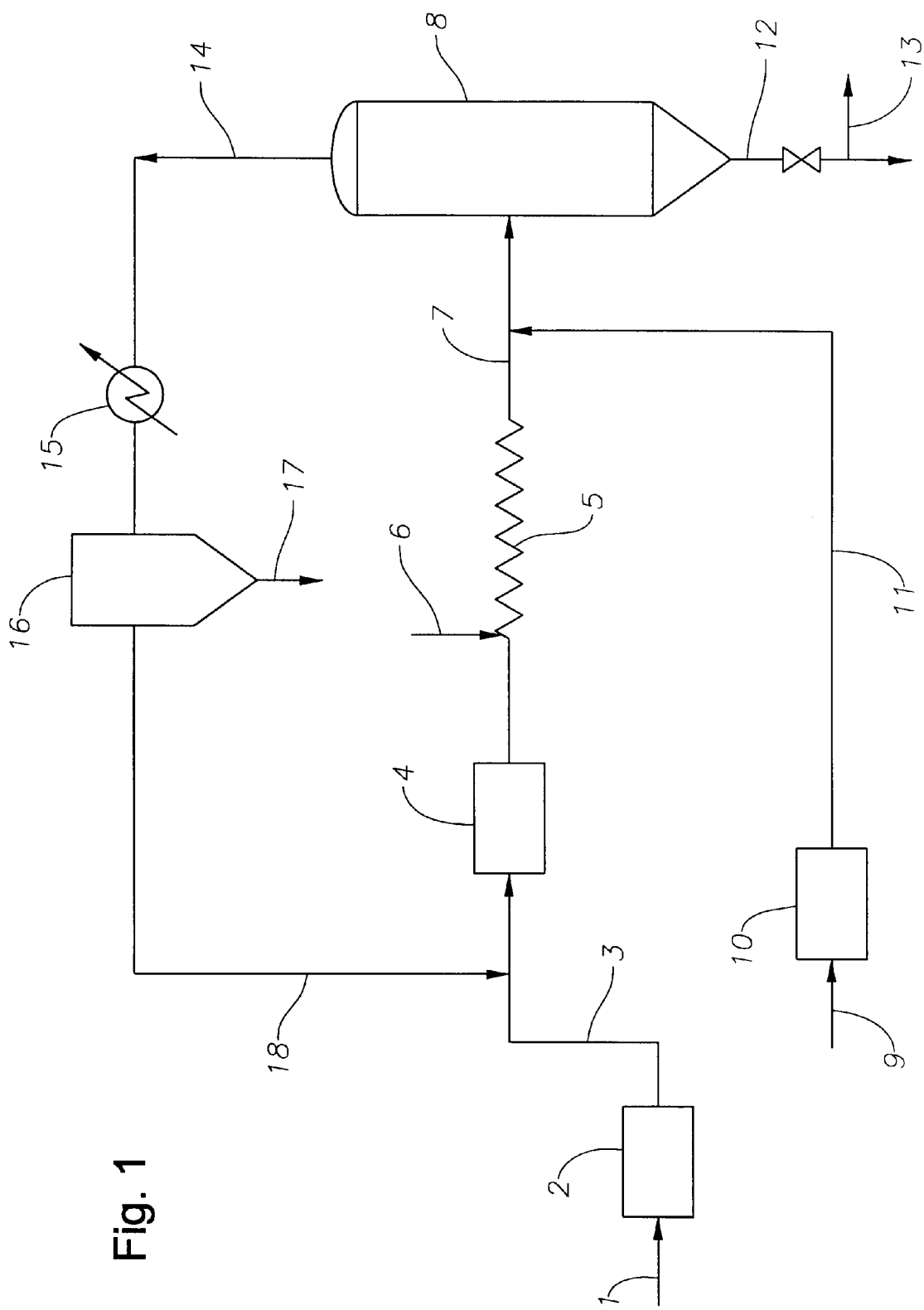

The linear low density ethylene copolymers (LLDPE) produced by the process of this invention may be, for example, linear copolymers of ethylene and a minor amount, e.g. 0.5 to 17 wt. %, preferably about 2 to 10 wt. %, of an 1-olefin comonomer containing more than 2 carbon atoms, preferably a 1-alkene containing 4 to 10 carbon atoms, and having a density of about 0.89 to 0.96, preferably about 0.91 to 0.94, a melting point of about 110 to 130° C., and a melt index of about 0.1 to 1000, preferably about 0.2 to 200 g/10 min. Comonomeric 1-olefins which may be employed are, for example, 1-butene, 1-pentene, 1-hexene, 4-methyl-1-pentene, 1-octene, 1-decene, and mixtures thereof.

The monomer mixture employed in the copolymerization process contains a higher proportion of 1-olefin based on the total of such mixture, i.e., the total of ethylene and 1-olefin, than is desired (in polymerized form) in the copolymer product. The reason for this is the greater tendency of ethylene to polymerize as compared with the 1-olefin comonomer, as discussed previously. In most cases, the monomeric mixture will contain about 0.5 to 85, preferably about 0.5 to 70 mole percent of 1-olefin, based on the total of ethylene and 1-olefin.

The catalyst used in the polymerization is a Ziegler catalyst, also referred to in the literature as coordination metal catalysts or Ziegler-Natta catalysts. These catalysts are composed of a transition metal halide and a reducing agent, generally an organometallic compound, e.g., a metal alkyl such as an aluminum trialkyl, or a metal hydride. The transition metal may be, for example any of those in Groups IVb to VIb of the Periodic Table and is preferably titanium, e.g., in the form of titanium trichloride or tetrachloride, while the metal of the organometallic compound or metal hydride may be selected from those in Groups Ia, IIa or IIIa of the Periodic Table, and is preferably aluminum in the form of an aluminum alkyl such as an alkyl aluminum halide or an aluminum trialkyl.

In view of the relatively elevated temperature and pressure at which the inventive process is carried out, it is preferred that the transition metal halide be employed in a form in which it is situated on a support base which is a metal from Groups IIa, IIIa or the first transition series other than copper of the Periodic Table e.g., a magnesium halide such as magnesium chloride. The supported transition metal halide component may be prepared, for example by co-comminuting the transition metal halide, the support base and an electron donor, e.g., containing C-O or C-N bonds, and forming a prepolymerized catalyst component by polymerizing a 1-olefin containing at least 4 carbon atoms with the comminuted supported transition metal composition. This prepolymerized component is then combined with the organometallic compound or metal hydride to form the catalyst in the process of this invention. The atomic ratio of Group Ia–IIIa metal to transition metal is generally in the range of about 3 to 200, preferably about 6 to 20. The catalyst may be prepared, for example, by any of the methods disclosed previously cited U.S. Pat. Nos. 4,405,774 and 4,530,774 and Japanese Kokai JP 86-276,804, the entire disclosures of which are incorporated by reference.

The catalyst is generally employed in the polymerization process in the form of a dispersion in an inert liquid which is pumped directly into the reactor. Inert liquids which may be used, for example, are saturated aliphatic hydrocarbons such as pentane, hexane, cyclohexane or heptane, aromatic hydrocarbons such as toluene, or inert petroleum fractions having ranges of boiling points similar to those of the foregoing hydrocarbons.

The polymerization reaction may be carried out at a temperature, for example, of at least about 125° C., prefer-ably about 150 to 350° C., and most preferably about 200 to 320° C., and a pressure of at least about 200 bars, preferably about 500 to 3500 bars, and most preferably about 700 to 2000 bars. The residence time in the reaction zone will generally be in the range, for example, of about 2 to 600 seconds, preferably about 10 to 240 seconds, and most preferably about 20 to 180 seconds. In general, the polymerization is carried under conditions such that the percent conversion of monomers to polymer is in the range of about 10 to 40%, preferably about 20 to 35%.

As stated, the temperature and pressure employed in the high pressure separator (HPS) are sufficiently reduced from the conditions employed in the reactor so that the reaction mixture separates into two phases, a polymer-rich dense phase and a light phase rich in unreacted monomers. To accomplish this, the temperature in the HPS will in most cases be, for example, at least about 40° C. below, preferably about 40 to 210° C. below, and most preferably about 50 to 150° C. below that in the reactor, and the pressure will be for example, at least about 350 bars below, preferably about 350 to 3360 bars below, and most preferably about 800 to 2800 bars below that in the reactor. However, in absolute terms, the temperature and pressure in the HPS will still be substantially above standard conditions, e.g., a temperature of about 140 to 250° C., preferably about 160 to 220° C., and a pressure of about 150 to 250 bars, preferably about 180 to 220 bars.

The amount of ethylene added to the reaction mixture being separated in the HPS is such that the concentration of 1-olefin comonomer in the light phase is sufficiently low so that the amount of polymer which dissolves in the light phase is significantly lower than if no ethylene is added to the reaction mixture being separated in the HPS. Because of this, there is less tendency for dissolved polymer to plug the equipment downstream of LPS through which the light phase is processed. Furthermore, the yield of polymer recovered from the dense phase is higher than if no ethylene is added to the reaction mixture being processed in the HPS.

The polymerization reaction and high pressure separation may be carried out in a batch, semi-continuous, or continuous operation. In a batch operation, for example, the reaction may be carried out to the desired degree in an autoclave, the reaction stopped by lowering the temperature and/or de-activating the catalyst, the reaction mixture transferred with a fresh supply of ethylene to a separate HPS where conditions are controlled to obtain dense and light phases as previously described, and the phases separately withdrawn for recovery of polymer from the dense phase and unreacted monomers from the light phase for re-use in the process. Alternatively, the same vessel may serve as the reactor and HPS such that after the conclusion of the reaction the conditions in the vessel are changed and ethylene is added to effect separation of the phases and recovery of polymer product and unreacted monomers in accordance with the inventive process. In one type of semi-continuous operation, at least two batch-type reactors may be utilized and their operation staggered such that a continuous stream of reaction product is passed together with a fresh supply of ethylene into a single HPS where the separation of phases and recovery of polymer and unreacted monomers are effected as described previously.

Preferably, the process is operated continuously such that a steady supply of monomers and catalyst are injected into a continuous tubular reactor, which is preferred, or alternatively, a continuous stirred tank or autoclave reactor. In a continuous tubular reactor, substantial concentration gradients of components exist between the inlet and outlet ends of the reactor. In a continuous stirred tank or autoclave reactor, little or no concentration gradients exist in the reactor. In either case, the reaction mixture together with a fresh supply of ethylene are passed continuously from the outlet of the reactor to an HPS where conditions of temperature and pressure are controlled such that the mixture separates into a polymer-rich dense phase and a light phase rich in unreacted monomers. The dense phase is continuously withdrawn from the lower part of the HPS for recovery of the polymer, while the light phase is continuously withdrawn from the upper part of the HPS for recycle to the reactor, preferably after some intermediate purification such as removal of polymer carryover from the stream.

The drawing shows a continuous form of the process wherein a fresh supply of a 1-olefin having more than 2 carbon atoms flows from its source through line 1 into pump 2 and thence into line 3 where it is combined with recycled ethylene and 1-olefin from line 18 to form the total monomer feed to the polymerization reaction. The latter feed enters hypercompressor 4 where it is compressed to reactor pressure and flows into tubular reactor 5 where it is combined with a catalyst dispersion pumped directly into the reactor through line 6. Subsequent to the polymerization reaction which occurs in reactor 5, a reaction mixture comprising polymer and unreacted monomers are withdrawn from the reactor through line 7 where the pressure is reduced to that utilized in high pressure separator (HPS) 8. Fresh ethylene which may contain up to about 2 vol. % of hydrogen for molecular weight regulation flows from its source through line 9 to primary compressor 10 which compresses it to the pressure utilized in separator 8, and thence through line 11 to line 7 where it is combined with the reaction mixture from reactor 5. The combined mixture now containing a substantially lower concentration of 1-olefin than the mixture leaving reactor 5 enters high pressure separator 8 where it is separated into a polymer-rich dense phase which is withdrawn from the lower part of separator 8 through line 12. After pressure reduction, an off gas composed mainly of unreacted monomers in the dense phase is drawn off through line 13 and the remaining polymer is sent to polymer recovery. The light phase rich in unreacted monomers is withdrawn from the upper part of separator 8 through line 14 and, after being cooled in cooler 15, enters knockout pot 16 where entrained polymer is separated and withdrawn through line 17. The unreacted monomers are recycled through line 18 to line 3 where they are combined with the fresh feed of 1-olefin as stated previously.

Not shown in the drawing are conventional means of heat transfer and pressure adjustment which are used to achieve the desired values of temperature and pressure at various points in the process.

The following example further illustrates the invention.

EXAMPLE

In the first part of this example which is not within the claimed invention but is provided for comparative purposes, ("the first case"), a process was carried out as shown in the drawing except that fresh ethylene from primary compressor 10 was not combined with the reaction mixture in line 7 just before entering high pressure separator 8, but was rather combined with fresh 1-hexene (as the 1-olefin) in line 3 and recycled unreacted monomers in line 18 before they flowed into hypercompressor 4 for compression to reactor pressure. In accordance with this procedure, 540 kg./hr. of fresh ethylene from primary compressor 10 and 629 kg./hr. of fresh 1-hexene from pump 2 were combined with 137 kg.,hr. of recycled ethylene and 1004 kg./hr. of recycled 1-hexene from line 18 to yield a total reactor feed mixture containing about 29 wt. % of ethylene and 71 wt. % of 1-hexene. The mixture was compressed to about 1000 bars in hypercompressor 4 before being passed into polymerization reactor 5 where the temperature was controlled at a peak of about 260° C. Ziegler catalyst in an amount of about 200–600 ppm based on the polymer produced was continuously passed into the reactor through line 6, such catalyst being prepared as described in previously cited U.S. Pat. No. 4,405,774 or U.S. Pat. No. 4,530,983. After a residence time of about 2 min., the reaction mixture composed of about 257 kg./hr. of ethylene, 1578 kg./hr. of 1-hexene, and 475 kg./hr. of polymer for a percent conversion of 20.6 wt. %, flowed from reactor 5 through line 7 and was passed into high pressure separator (HPS) 8 operating at about 200 bars pressure and 180° C. where the mixture was separated into a dense phase containing almost all the polymer and some unreacted monomer and a light phase containing a major proportion of unreacted monomer and a small amount of dissolved polymer. The dense phase was withdrawn from the lower part of HPS 8 through line 12, with its unreacted monomer component containing 120 kg./hr. of ethylene and 574 kg./hr. of 1-hexene being separated as an off gas through line 13 after pressure reduction, and the polymer component in an amount of 475 kg./hr. being sent to polymer recovery. The light phase containing 137 kg./hr. of ethylene, 1004 kg./hr. of 1-hexene and 0.5 kg./hr. of polymer was withdrawn from HPS 8 through line 14 and passed through cooler 15 into knockout pot 16 where the polymer carryover was removed through line 17. The remaining stream consisting mainly of ethylene and 1-hexene was then recycled through line 18 to line 3 where it was combined with fresh 1-hexene from pump 2 and fresh ethylene from primary compressor 10.

The LLDPE product from the first case was a copolymer of ethylene and about 11.6 wt. % of 1-hexene based on the weight of total polymer. The polymer had a density of about 0.918, a melting point of 117–118° C., and a melt index of about 5.

If it is attempted to obtain essentially the same polymer from the foregoing process at a higher percent conversion, the percent of unreacted 1-hexene in the light phase will be significantly higher than it is at lower conversions because it tends to polymerize much less readily than ethylene under any particular set of conditions. This causes a larger amount of polymer to dissolve in the light phase because it is more soluble in a 1-olefin containing more than 2 carbon atoms, such as 1-hexene, than it is in ethylene. This in turn results in a greater tendency for the equipment downstream of the HPS to plug at such high conversion than at lower conversions.

The second part of this example ("the second case") is carried out in accordance with the invention as shown in the drawing. In this case, 775 kg./hr. of free 1-hexene from pump 2 are combined with 677 kg./hr. of recycled ethylene and 856 kg./hr. of recycled 1-hexene from line 18 to yield the same total reactor feed mixture employed in the first part of this example, viz., 2310 kg./hr. of a mixture containing about 29 wt. % of ethylene and about 71 wt. % of 1-hexene. The mixture is compressed to 1000 bars in hypercompressor 4 before being passed into reactor 5 where the temperature is controlled at a peak of about 250° C. and where it is combined with 200–600 ppm based on the polymer produced of the same catalyst as that employed in the first part of this example. After a residence time of about 2 min., the reaction mixture composed of 107 kg./hr. of ethylene, 1559 kg./hr. of 1-hexene and 644 kg./hr. of polymer for a percent conversion of about 27.9%, leaves reactor 5 and is combined with 749 kg./hr. of ethylene from primary compressor 10 and the entire stream is passed into HPS 8 operating at about 200 bars pressure and about 180° C., where it is separated into dense and light phases as described in the first part of this example. The dense phase leaving HPS 8 through line 12 contains substantially all the polymer, viz. 644 kg./hr., and unreacted monomers in amounts of 179 kg./hr. of ethylene and 701 kg./hr. of 1-hexene which are drawn off through line 13 as off gas. The light phase containing 677 kg./hr. of ethylene, 856 kg./hr. of 1-hexene, and 0.6 kg./hr. of polymer leaves HPS 8 through line 14 and after being cooled in cooler 15, the polymer is removed in knockout pot 16 and withdrawn through line 17. The ethylene and 1-hexene in the light phase are recycled to hypercompressor 4 and reactor 5 after being combined with fresh 1-hexene from pump 2, as described.

The foregoing second case wherein fresh ethylene is fed directly to the HPS with the reaction mixture yields an LLDPE having essentially the same composition and properties as that obtained in the first case wherein fresh ethylene is fed to the rector with fresh 1-hexene and recycled monomers, but at a considerably higher percent conversion of monomers in the second case, viz., 27.9% as compared with 20.6% in the first case. Furthermore, this is accomplished without any increased tendency for equipment downstream of the HPS to become plugged with polymer, since the percent polymer in the light phase leaving the HPS is not significantly higher in the second case that in the first case. The reason for this is that because of the direct injection of fresh ethylene into the HPS in the second case, the percent of 1-hexene in the light phase is substantially lower than it is in the first case despite the fact that it polymerizes more slowly than ethylene. Thus, in the second case, a lower percentage of polymer tends to dissolve in the light phase providing for the possibility of further increasing the conversion and/or decreasing the density of the polymer without exceeding the degree of polymer plugging corresponding to the first case.

I claim:

1. A process for producing polyethylene copolymer, the process comprising:

copolymerizing monomers comprising ethylene and a 1-olefin of 4 to 10 carbon atoms in a high pressure polymerization reactor to produce a reaction mixture comprising copolymer and monomers;

passing said reaction mixture to a high pressure separator (HPS);

separating said reaction mixture into a light phase and a dense phase, wherein the light phase comprises some of said copolymer and a major proportion of said monomers, wherein the copolymer is at least partially soluble in said light phase and wherein a major proportion of the dense phase is said copolymer;

introducing additional ethylene into said HPS, wherein said additional ethylene is in an amount sufficient to decrease the concentration of the 1- olefin in the light phase and to decrease the amount of copolymer which is soluble in the light phase; and recovering the copolymer.

2. The process of claim 1, wherein the monomers in the light phase are recycled.

3. The process of claim 1, wherein said additional ethylene utilized in said process is recycled to said (HPS).

4. The process of claim 1, wherein said 1-olefin is selected from the group consisting of 1-butene, 1-pentene, 1-hexene, 4-methyl-1-pentene, 1-octene, 1-decene, and mixtures thereof.

5. The process of claim 1, wherein the monomers in said reactor comprise about 0.5 to 85.0 mole percent of said 1-olefin based on the total moles of ethylene and 1-olefin.

6. The process of claim 1, wherein the monomers in said reactor comprise about 0.5 to 70.0 mole percent of said 1-olefin based on the total moles of ethylene and 1-olefin.

\* \* \* \* \*